United States Patent
Nakagawa

(10) Patent No.: US 9,992,095 B2
(45) Date of Patent: Jun. 5, 2018

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Kaori Nakagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 15/080,359

(22) Filed: Mar. 24, 2016

(65) Prior Publication Data
US 2016/0294736 A1  Oct. 6, 2016

(30) Foreign Application Priority Data
Mar. 31, 2015 (JP) ................. 2015-070921

(51) Int. Cl.
| | |
|---|---|
| H04L 12/861 | (2013.01) |
| H04L 12/26 | (2006.01) |
| H04N 1/00 | (2006.01) |
| H04L 12/835 | (2013.01) |
| H04L 12/823 | (2013.01) |

(52) U.S. Cl.
CPC ............ *H04L 43/16* (2013.01); *H04L 47/30* (2013.01); *H04L 47/32* (2013.01); *H04N 1/00209* (2013.01); *H04L 43/0829* (2013.01)

(58) Field of Classification Search
None
See application file for complete search history.

(56) References Cited

U.S. PATENT DOCUMENTS

| | | | | |
|---|---|---|---|---|
| 5,384,772 A | * | 1/1995 | Marshall | H04L 29/06 370/235 |
| 7,733,848 B2 | * | 6/2010 | Ulybin | H04L 12/4633 358/1.15 |
| 2002/0026310 A1 | * | 2/2002 | Mochida | G10L 15/30 704/201 |
| 2005/0058146 A1 | * | 3/2005 | Liu | H04J 3/0632 370/412 |

(Continued)

FOREIGN PATENT DOCUMENTS

JP  2010-166188 A  7/2010

*Primary Examiner* — Eunsook Choi
(74) *Attorney, Agent, or Firm* — Canon U.S.A., Inc. IP Division

(57) ABSTRACT

A communication apparatus that includes a buffer, an acquisition unit, a packet processing unit, and a control unit performs packet communication of image data as audio data via a first channel and performs procedure signal exchange via a second channel. The buffer temporarily stores transmitted and received packets to synchronize the packets between a transmitting and a receiving side. The acquisition unit acquires a number of packets stored in the buffer. The packet processing unit performs packet processing by discarding a packet stored in the buffer where the number of acquired packets exceeds a first threshold value, and inserting a silent packet in the buffer where the number of acquired packets does not exceed a second threshold value. The control unit performs procedure signal exchange according to a packet stored in the buffer in which the number of packets is adjusted upon completion of the performed packet processing.

10 Claims, 8 Drawing Sheets

(56) References Cited

U.S. PATENT DOCUMENTS

| | | | |
|---|---|---|---|
| 2006/0062215 A1* | 3/2006 | Lam | H04L 29/06027 370/389 |
| 2007/0091873 A1* | 4/2007 | LeBlanc | H04B 3/23 370/352 |
| 2008/0304474 A1* | 12/2008 | Lam | F04B 17/06 370/352 |
| 2011/0044288 A1* | 2/2011 | Nagasawa | H04W 36/26 370/331 |

* cited by examiner

COMMUNICATION APPARATUS, METHOD FOR CONTROLLING COMMUNICATION APPARATUS, AND STORAGE MEDIUM

BACKGROUND OF THE INVENTION

Field of the Invention

The present invention relates to a communication apparatus, a method for controlling the communication apparatus, and a storage medium.

Description of the Related Art

With the widespread use of the Internet and intranets, the number of Internet Protocol (IP) phones is increasing. The IP phone controls generation, modification, and disconnection of a real-time communication session by using a call control protocol such as Session Initiation Protocol (SIP). The IP phone performs call processing by encoding and compressing the audio (voice and sound) signal in various forms based on the Voice over Internet Protocol (VoIP) technique, performing IP packetizing, and transmitting IP packets to an IP network in real time.

Recently, the G3 facsimile apparatus has also connected with an IP network via a terminal adopter (TA) having a VoIP function and a gateway (GW). Accordingly, VoIP-based facsimile communication via the IP network is increasing. Further, there has been proposed a facsimile apparatus having the VoIP function and employing the deemed voice communication method in which the facsimile apparatus itself directly connects with an IP network and performs audio encoding/decoding and IP packetizing.

On the IP network, since the communication speed is not necessarily kept constant, audio data packets divided and separately transmitted do not necessarily reach the receiving facsimile apparatus side at the same timing as the transmission timing, causing irregular transmission intervals. The IP phone and the facsimile apparatus using the deemed voice communication method absorb and correct such fluctuations of irregular packets to reproduce voice similar to that on the transmitting side. Therefore, the facsimile apparatus is provided with a jitter buffer to prevent interruption of packet output (see FIG. 5). The jitter buffer outputs pre-read audio data packets to an audio codec after accumulating audio data packets to a certain extent.

As the size of the jitter buffer is larger, the number of packets to be accumulated becomes larger and fluctuations of packets can be further reduced. However, the output will be delayed for the time period corresponding to the time period of accumulating packets. Accordingly, from the viewpoint of voice communication and communication quality, it is not desirable to pre-read too many audio data packets by using an excessively large jitter buffer.

The jitter buffer is a First-In First-Out (FIFO) buffer which outputs old audio data packets in the jitter buffer at a timing synchronized with a sampling period of the audio codec while receiving new audio data packets. Audio data packets in the jitter buffer are output in synchronization with the sampling period of the audio encoding method predetermined between the transmitting and the receiving sides, and are reproduced by the audio codec. The reproduced audio signal is input to a telephone or a modem of the facsimile control unit, and voice communication and facsimile communication are performed. Similarly, the transmitting side also transmits audio data packets in synchronization with the sampling period of the audio encoding method predetermined between the transmitting and the receiving sides.

The oscillating frequency of a crystal oscillator is input to the audio codec to generate the sampling period. A difference in the oscillating frequency thereof between the transmitting and the receiving sides causes a difference between the amount of encoded audio data on the transmitting side and the amount of decoded audio data on the receiving side.

Performing facsimile communication for a long period of time in such a state may cause an overflow or underflow of the amount of data in the jitter buffer, possibly resulting in the communication error in facsimile communication.

When the general clock accuracy is ±100 parts per million (ppm) and the packet size is equivalent to 20 milliseconds, the time period T until a difference for one packet occurs is calculated as follows. When the clock accuracies on the transmitting and the receiving sides shift to opposite sides to the maximum extent, the time period T is calculated as T=(20/1000)/((100+100)/1000000)=100 seconds. In this case, if the size of the jitter buffer is equivalent to 20 packets (=400 milliseconds), and if output is started after data for 10 packets (=200 milliseconds) has been captured, a delay of 200 milliseconds occurs when communication is started. Further, a difference for 10 packets toward the positive or the negative side causes an overflow or underflow. Therefore, at most, an error occurs at intervals of 100×10=1000 seconds.

Therefore, performing facsimile communication for a long period of time by using a jitter buffer of the regular size will cause a communication error. Since increasing the size of the jitter buffer increases the delay, the size of the jitter buffer can be increased only to a certain extent in the case of facsimile communication in which the response timing is predefined.

Therefore, a jitter buffer for a facsimile apparatus using the deemed voice communication method needs to have the regular size buffer causing a small amount of delay. Further, it is necessary to perform control for preventing an overflow or underflow in the jitter buffer as required.

Modem modulation methods for the G3 facsimile procedure include the V.17 communication procedure or earlier (see FIG. 6) which is a half-duplex communication sequence in which a signal is not sent from a communication partner facsimile apparatus while the own facsimile apparatus is transmitting a signal. Modem modulation methods further include the V.34 facsimile procedure, which is a full-duplex communication sequence (see FIG. 7) except for image data communication.

With the V.17 facsimile procedure or earlier, the own facsimile apparatus does not receive an effective audio signal from a communication partner facsimile apparatus during facsimile procedure signal transmission, and basically audio data packets contain silence. Therefore, operating audio data packets in the jitter buffer during the facsimile procedure signal transmission does not affect facsimile communication. The jitter buffer can be operated during facsimile procedure signal transmission immediately before image data reception.

Japanese Patent Application Laid-Open No. 2010-166188 discusses a technique for correcting a jitter buffer to the initial state by a terminal adopter, connecting a G3 facsimile apparatus with an IP network, synchronizing with the facsimile procedure signal transmission.

In this control example of prior art, when the amount of data in the jitter buffer shifts toward the depletion side after synchronization with the timing of signal transmission from the connected G3 facsimile apparatus, silent data is inserted so that the final data position in the jitter buffer returns to a predetermined value. On the other hand, when the amount of data in the jitter buffer shifts toward the saturation side, data is discarded so that the final data position becomes a predetermined value.

However, the above-described conventional technique is not effective with the V.34 facsimile procedure for the following reasons.

The V.34 facsimile procedure performs communication by using a primary channel for performing high-speed transmission of image data as illustrated in FIG. 7 and a control channel for performing low-speed procedure signal exchange.

In the primary channel for performing image data reception through half-duplex communication, the receiving facsimile apparatus side receives significant image data and hence the jitter buffer adjustment cannot be performed during image data reception because the jitter buffer adjustment will cause an image error. In the control channel for performing the facsimile procedure through full-duplex communication, the receiving side receives a significant signal from a communication partner facsimile apparatus side at the same time when the receiving side transmits a signal and hence the jitter buffer adjustment cannot be performed during image data reception.

Since the control channel performs phase modulation, inserting or deleting a packet to adjust the amount of data in the jitter buffer may cause a phase shift to cause synchronization loss between modems, making it impossible for the receiving side to perform decoding.

In the V.34 facsimile procedure, therefore, while the own facsimile apparatus is transmitting a signal, the facsimile apparatus constantly receives a significant signal, so that it is difficult to perform the jitter buffer adjustment involving the cancellation and supplement of data in the jitter buffer.

In the V.34 facsimile procedure, if synchronization loss between modems on the transmitting and the receiving sides is likely to occur under inferior communication conditions, a certain procedure aims for achieving resynchronization between modems through control channel retraining (see FIG. 8).

Referring to FIG. 8, the receiving side transmits a signal AC to start the control channel retraining. The signal AC is sent out so as to provide signals with a 180-degree phase rotation on an alternate basis. This signal needs to be responded whenever it is transmitted during control channel communication, and therefore is constantly monitored both on the transmitting and the receiving sides.

Accordingly, even under inferior line conditions, the signal AC is easier to be detected than other signals to start the control channel retraining. When the control channel retraining is started by the signal AC, the receiving and the transmitting sides perform the resynchronization procedure (exchange of shaded signals PPh, ALT, MPh, MPh, and E illustrated in FIG. 2) to recover synchronization between modems again.

The control channel retraining is an effective method for avoiding a communication error caused by modem synchronization loss and divergence due to packet loss, etc. However, it is not possible to avoid a communication failure due to an underflow or overflow in the jitter buffer which causes packet loss.

SUMMARY OF THE INVENTION

According to an aspect of the present invention, a communication apparatus is provided with the following configuration.

A communication apparatus configured to perform, by using an internet protocol (IP) network, packet communication of image data as audio data via a first channel and to perform procedure signal exchange via a second channel, includes a buffer configured to temporarily store transmitted and received packets to synchronize the transmitted and received packets between a transmitting and a receiving side, an acquisition unit configured to acquire a number of packets stored in the buffer, a packet processing unit configured to perform packet processing by discarding a packet stored in the buffer in a case where the number of acquired packets exceeds a first threshold value, and inserting a silent packet in the buffer in a case where the number of acquired packets does not exceed a second threshold value, and a control unit configured to perform procedure signal exchange according to a packet stored in the buffer in which the number of packets is adjusted upon completion of the packet processing performed by the packet processing unit.

Even with a full-duplex control channel, the present invention suitably performs jitter buffer control and resynchronization between modems to improve communication quality. Further features of the present invention will become apparent from the following description of exemplary embodiments with reference to the attached drawings.

DESCRIPTION OF THE EMBODIMENTS

An exemplary embodiment of the present invention will be described below with reference to the accompanying drawings.

<Descriptions of System Configuration>

Figure 1:
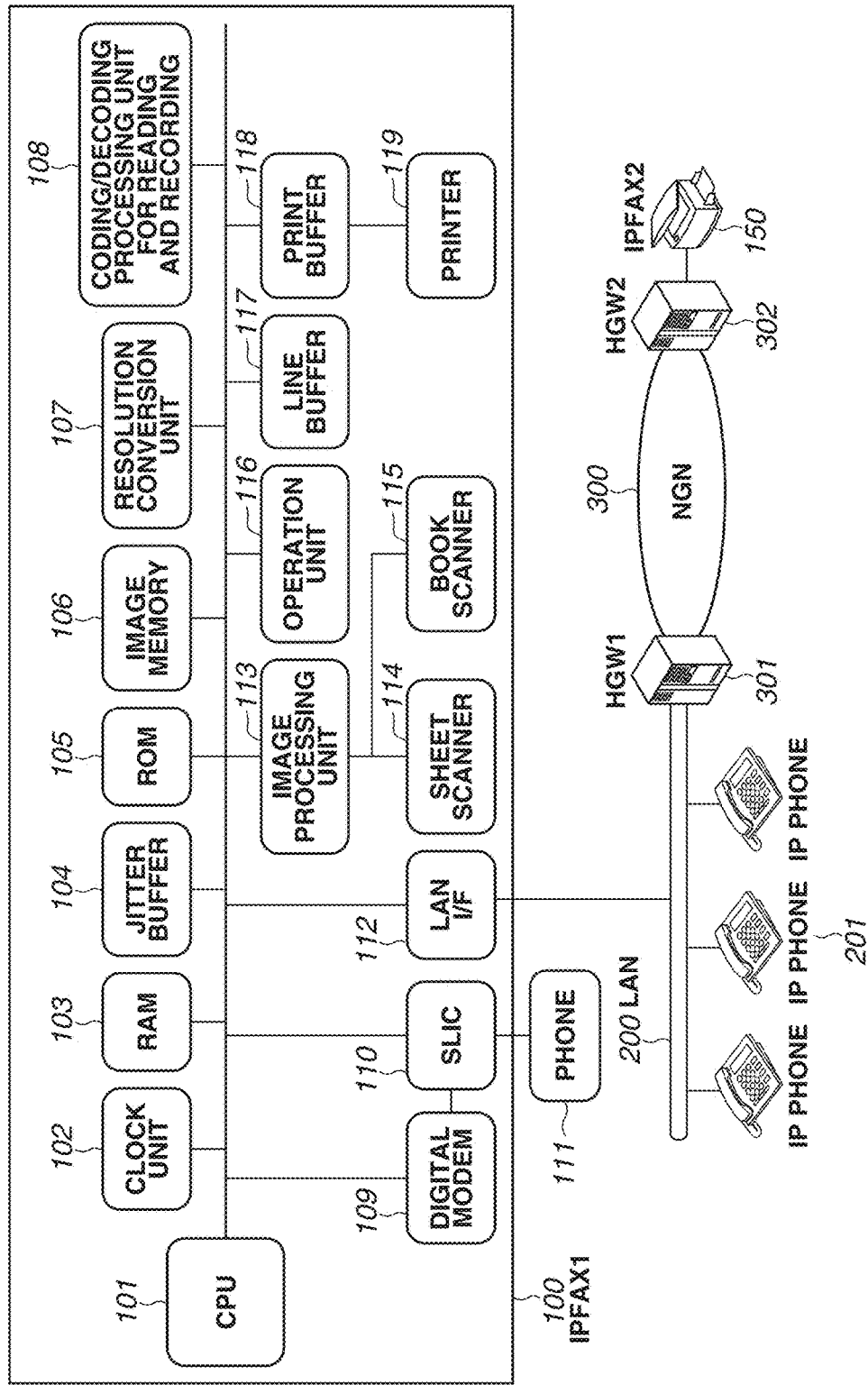
FIG. 1 is a block diagram illustrating a configuration of a communication apparatus.

FIG. 1 is a block diagram illustrating a configuration of a communication apparatus according to the present exemplary embodiment. In the present exemplary embodiment to be described below, an Internet facsimile using a deemed voice communication method performs jitter buffer control in V.34 reception processing, and then performs control channel retraining to continue communication. The communication apparatus according to the present exemplary embodiment is a facsimile apparatus using the deemed voice communication method, and is connected with an Internet Protocol (IP) public network (Next Generation Network (NGN)). The IP public network is also referred to as an IP network. A description will be given of a configuration of a communication apparatus for performing packet communication on image data as audio data via the first channel and performing procedure signal exchange via the second channel by using the IP public network, according to a predetermined convention (International Telecommunication Union Telecommunication Standardization Sector (ITU)-T Recommendation version V.34).

Referring to FIG. 1, facsimile apparatuses 100 and 150 (hereafter referred to as IP address FAX 1 (IPFAX1 100) and IPFAX2 150 respectively) including components 101 to 119 employ the deemed voice communication method. A central processing unit (CPU) 101 is a system control unit for controlling the entire communication apparatus. A clock unit 102 including a crystal oscillator is used for timing applications.

A random access memory (RAM) 103 including a static RAM (SRAM) is used to store apparatus setting information, image data management information, and other data which needs to be backed up. A jitter buffer 104 including a RAM, etc. is used to correct the arrangement of irregular audio data packets received by a local area network interface (LAN I/F) 112. The jitter buffer 104 functions as a buffer for temporarily storing transmitted and received packets to realize packet synchronization between the transmitting and the receiving sides.

A read only memory (ROM) 105 stores a control program of the CPU 101. An image memory 106 including a dynamic RAM (DRAM), etc. is used to store image data. A resolution conversion processing unit 107 performs resolution conversion control such as millimeter-to-inch resolution conversion on raster data. A coding/decoding processing unit for reading and recording 108 (codec for reading and recording) performs encoding and decoding processing on image data handled by the communication apparatus.

A digital modem 109 modulates procedure signals and image data from the communication apparatus and performs audio encoding processing by using, for example, a built-in G.711 audio CODEC. Then, the digital modem 109 transmits digital data to the IP network, without digital-to-analog conversion processing being performed by an analog modem.

A subscriber line interface circuit (SLIC) 110 performs analog-to-digital conversion processing and telephone line emulation by using, for example, the G.711 audio CODEC. The SLIC 110 enables connecting an analog telephone to the IP network without using a telephone line, and providing a function of emulating a telephone line, such as the generation of a call signal and various tone signals for a telephone line (exchanging system). An analog telephone 111 is, for example, a handset or an answering machine used for voice communication. The LAN I/F 112 is used for network control. An image processing unit 113 performs correction processing on image data read by a scanner, and outputs high definition image data.

A sheet scanner 114 and a book scanner 115, each including a contact sensor (CS) image sensor and a document conveyance mechanism, optically read a document and convert read data into electrical image data. Both scanners read a double-sided document. An operation unit 116 including a keyboard and a display unit allows an operator to perform various input operations. A line buffer 117 is used when image data transmission control is performed.

A print buffer 118 is a buffer memory for storing printing text codes for one page. A printer 119 is, for example, a laser beam printer (LBP) for recording received images and file data on plain paper. The printer 119 is capable of performing double-sided printing. A LAN 200 indicates an in-house intranet or a home IP network. IP phones 201 are telephones usable on the IP network, and, more specifically, are controlled to be used as extension telephones via a home gateway (HGW)1 301. An NGN 300 indicates a public IP network. The HGWs 301 and 302 are gateway apparatuses for connecting the NGN 300 (public IP network) and the LAN 200, and function as call control servers for the IP phones 201 and IPFAXs connected to the LAN 200.

Figure 2:
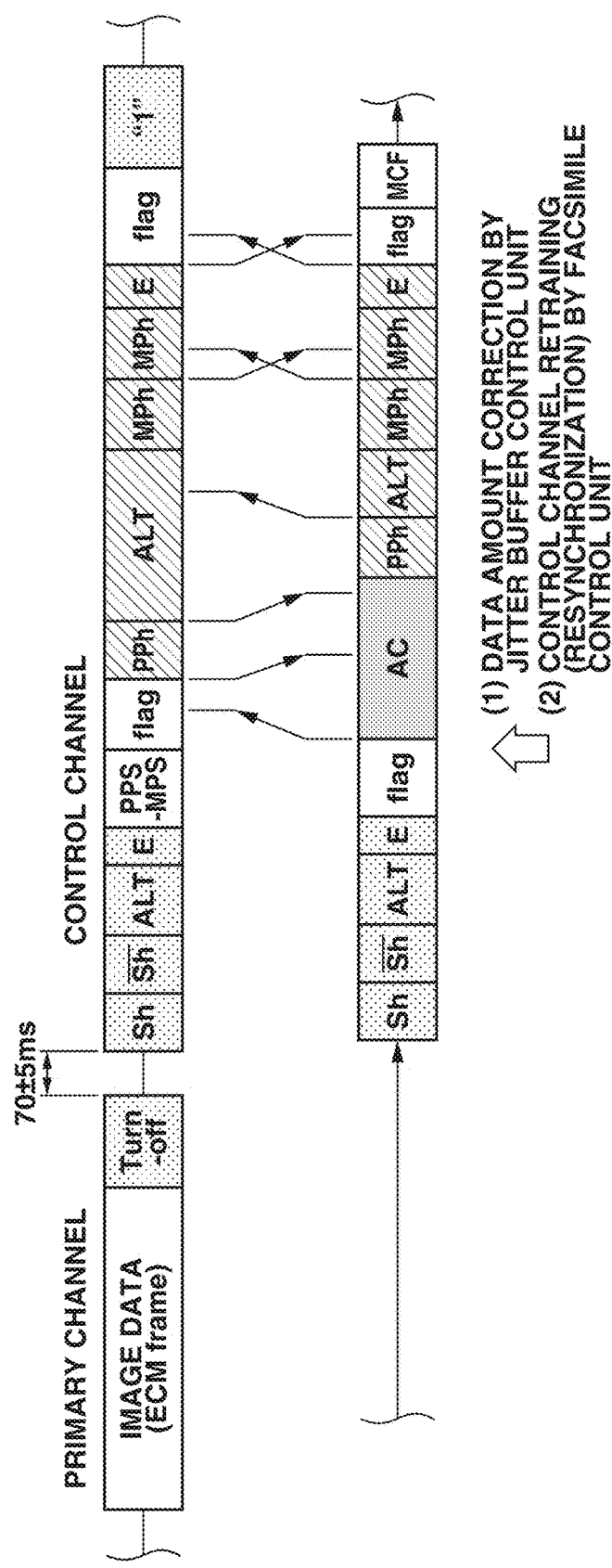
FIG. 2 is a timing chart illustrating operations of the communication apparatus.

FIG. 2 is a timing chart illustrating operations of the communication apparatus illustrated in FIG. 1. In this example of a timing chart, the facsimile apparatus using the deemed voice communication method performs jitter buffer control and then performs control channel retraining.

Referring to FIG. 2, the facsimile apparatus checks the amount of data in the jitter buffer 104 at the time of the transition to the control channel. FIG. 2 illustrates a state where, when the jitter buffer 104 is likely to underflow or overflow, the facsimile apparatus performs jitter buffer correction and then immediately performs control channel retraining.

More specifically, the facsimile apparatus performs control channel retraining after correcting the amount of data in the jitter buffer 104. Therefore, the facsimile apparatus normally performs the resynchronization procedure (exchange of shaded signals PPh, ALT, MPh, MPh, and E illustrated in FIG. 2) without signal loss due to an underflow or overflow in the jitter buffer 104. If the facsimile apparatus performs only the processing for correcting the amount of data in the jitter buffer 104 in jitter buffer control, a modem divergence will be caused by an error due to procedure signal loss or by synchronization loss due to a phase shift.

Figure 3:
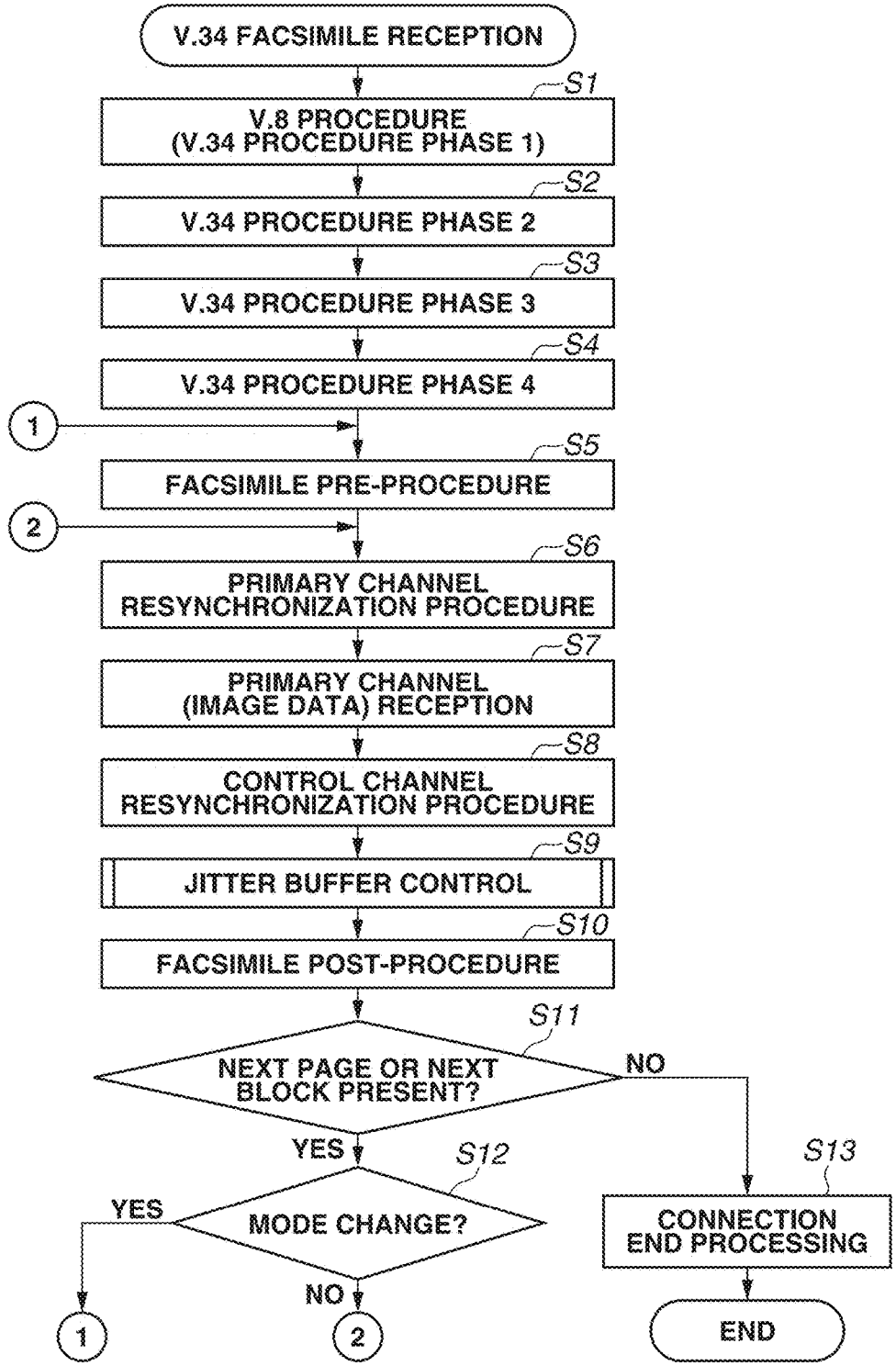
FIG. 3 is a flowchart illustrating a method for controlling the communication apparatus.

FIG. 3 is a flowchart illustrating a method for controlling the communication apparatus according to the present exemplary embodiment. An example of modem control in which the facsimile apparatus using the deemed voice communication method performs the V.34 facsimile reception is described. Each step of this flowchart is implemented when a CPU (not illustrated) of the digital modem 109 executes a stored control program.

Referring to FIG. 3, in step S1, the digital modem 109 starts the V.34 facsimile reception from the V.8 procedure. The V.8 procedure is prescribed as the V.34 procedure phase 1 for automatically determining the best V series modem between the transmitting and the receiving sides.

Following the V.8 procedure, in step S2, the digital modem 109 performs the V.34 procedure phase 2, i.e., line probing for determining the communication speed in the primary channel. In step S3, the digital modem 109 performs the V.34 procedure phase 3, i.e., training processing on an equalizer and an echo canceller.

In step S4, the digital modem 109 performs the V.34 procedure phase 4 for parameter exchange. This completes the start-up of the V.34 procedure, and starts the control channel (CC).

In step S5, the digital modem 109 performs facsimile pre-procedure conforming to T.30 for performing facsimile communication. When the facsimile pre-procedure is completed, in step S6, the digital modem 109 performs primary channel resynchronization procedure for shifting to the primary channel. In step S7, the digital modem 109 performs primary channel reception to receive image data at high speed. When the primary channel reception is completed, in step S8, the digital modem 109 performs the control channel resynchronization procedure for performing the facsimile post-procedure to shift to the control channel.

Figure 5:
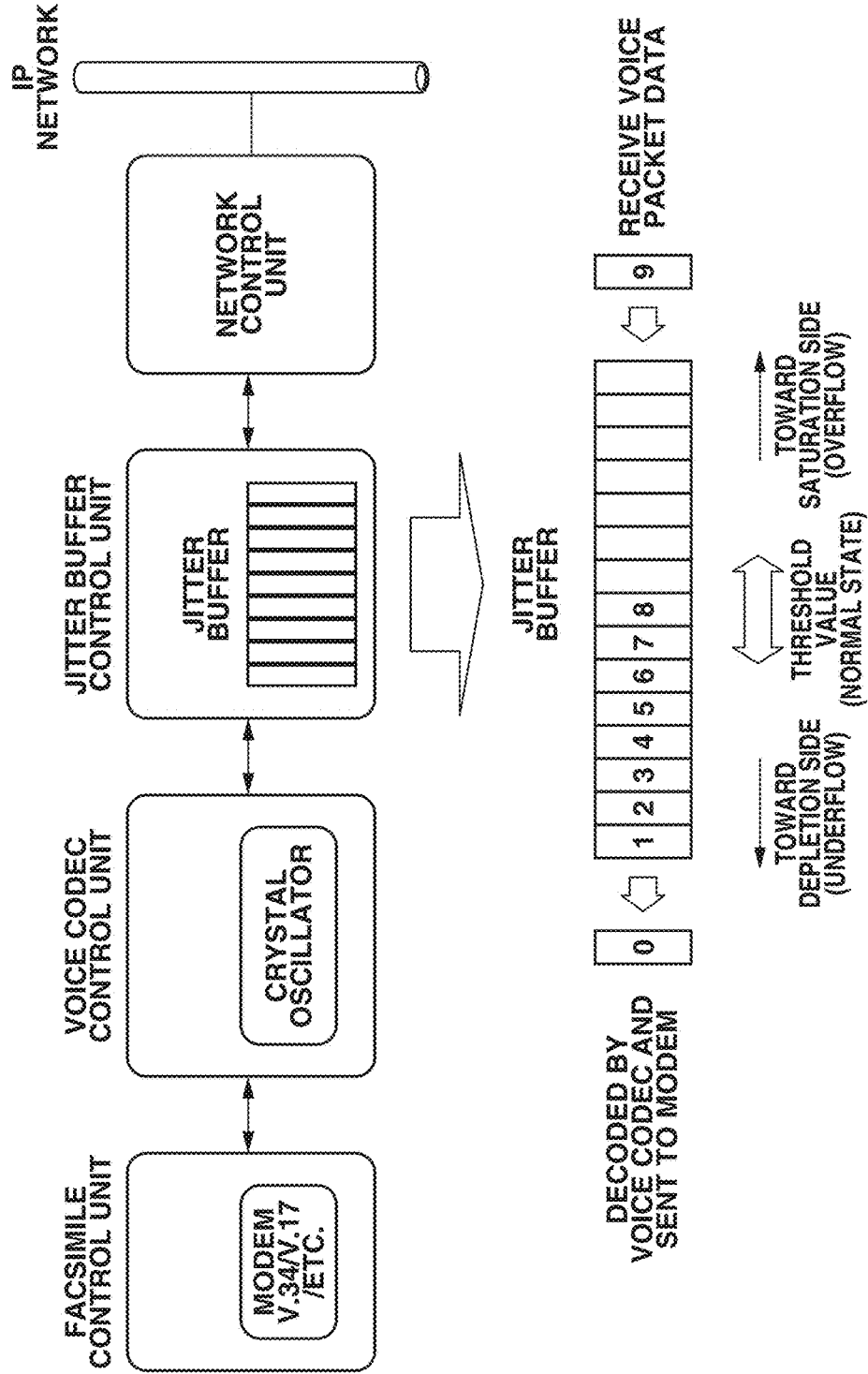
FIG. 5 illustrates operations of a conventional communication apparatus.
Figure 6:
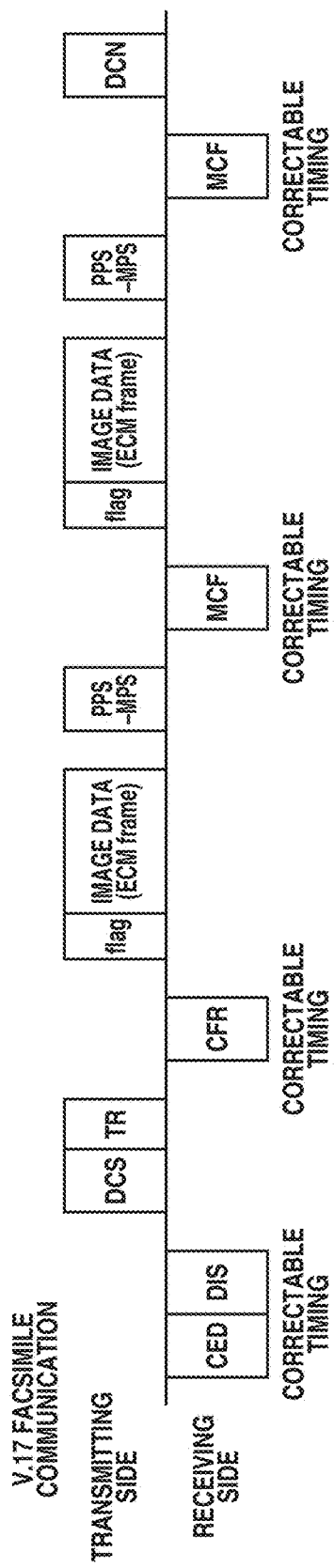
FIG. 6 illustrates operations of a conventional communication apparatus.
Figure 7:
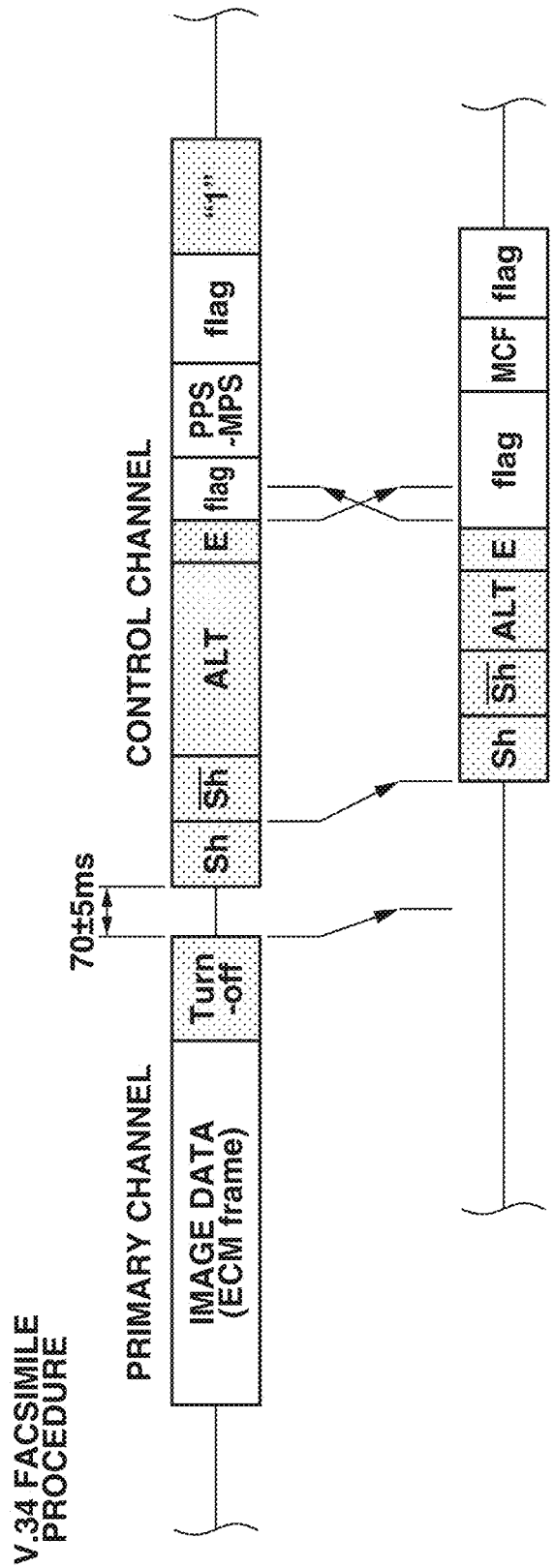
FIG. 7 illustrates operations of a conventional communication apparatus.

When the control channel is started, in step S9, the digital modem 109 performs jitter buffer control. The jitter buffer 104 is a First-In First-Out (FIFO) buffer as illustrated in FIG. 5. The digital modem 109 controls the amount of data in the jitter buffer 104 to fall within a certain range to prevent the amount of data in the jitter buffer 104 from underflowing or overflowing. Step S9 will be described in detail below.

In the present exemplary embodiment, the intermediate position within the fixed range is set as a median, a certain range from the median toward the depletion side is set as an underflow threshold value, and a certain range from the median toward the saturation side is set as an overflow threshold value.

In step S10, the digital modem 109 performs the facsimile post-procedure conforming to T.30. In step S11, the digital modem 109 determines whether transmit data of the following page or the following block is present. If the digital modem 10 determines that transmit data of the following page or the following block is present (YES in step S11), the processing proceeds to step S12. In step S12, the digital modem 109 further determines whether there has been a mode change, i.e., whether the speed or resolution has been changed.

If the digital modem 109 determines that there has been a mode change (YES in step S12), the processing returns to step S5. In step S5, the digital modem 109 performs the facsimile pre-procedure conforming to T.30.

On the other hand, if the digital modem 109 determines that there has been no mode change (NO in step S12), the processing returns to step S6. In step S6, the digital modem 109 performs the primary channel resynchronization procedure.

On the other hand, in step S11, if the digital modem 109 determines that transmit data of the following page or the following block is not present, i.e., communication ends (NO in step S11), the processing proceeds to step S13. In step S13, the digital modem 109 performs end processing on the V.34 procedure control channel. Then, the digital modem 109 ends the V.34 facsimile reception.

Figure 4:
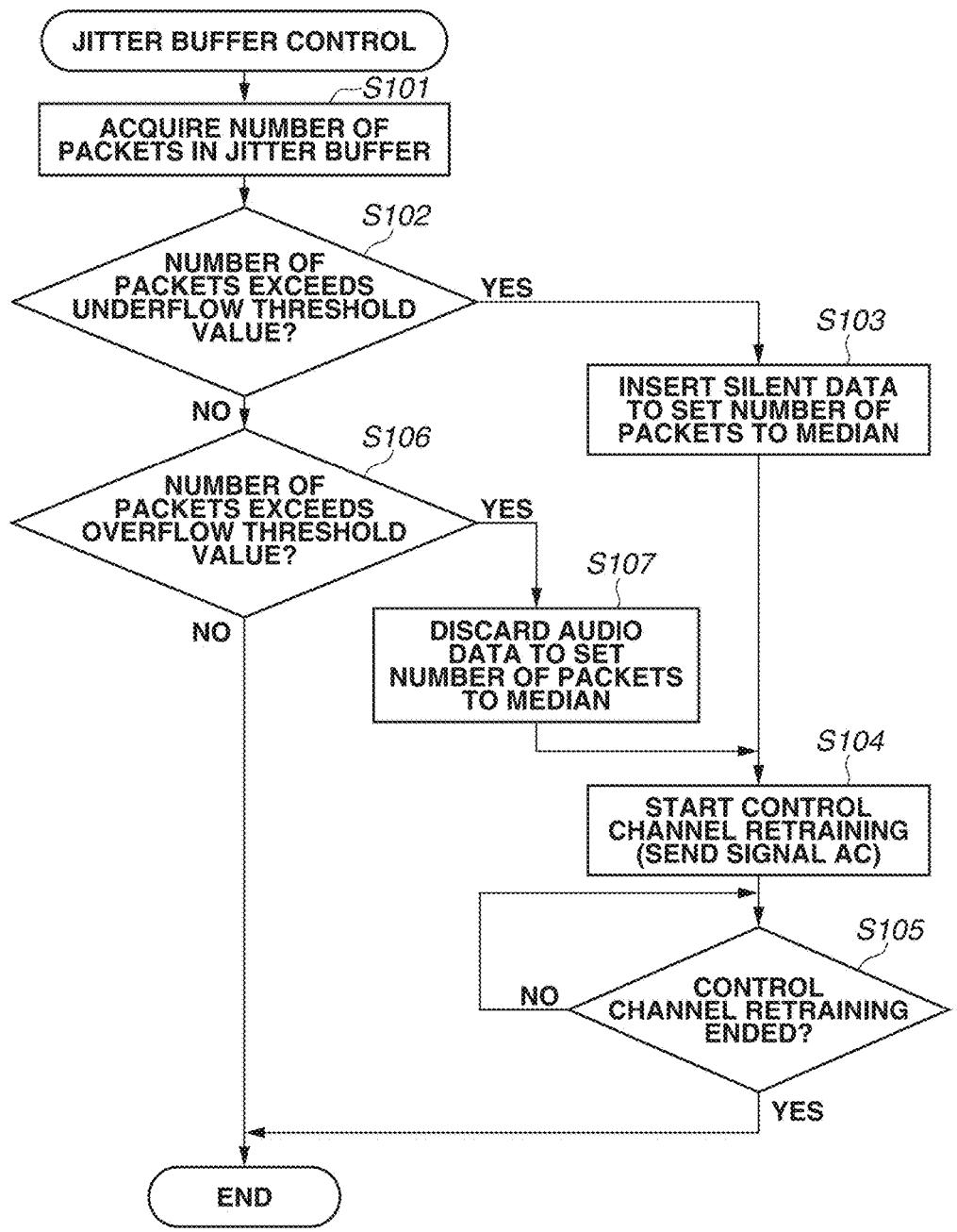
FIG. 4 is a flowchart illustrating the method for controlling the communication apparatus.

FIG. 4 is a flowchart illustrating a method for controlling the communication apparatus according to the present exemplary embodiment. This example corresponds to a detailed procedure of the jitter buffer processing in step S9 of the flowchart illustrated in FIG. 3. Each step of this flowchart is implemented when the CPU (not illustrated) of the digital modem 109 executes a stored control program. When the number of acquired packets exceeds a first threshold value, the CPU discards a packet stored in the jitter buffer 104. On the other hand, when the number of packets acquired does not exceed a second threshold value, the CPU inserts a silent packet in the jitter buffer 104. This packet processing will be described in detail below. The silent packet is a packet having data of a lower level than a predetermined audio level.

In step S101, the digital modem 109 acquires the number of audio data packets in the jitter buffer 104. In step S102, the digital modem 109 determines whether the number of audio data packets exceeds the underflow threshold value.

If the digital modem 109 determines that the number of audio data packets exceeds the underflow threshold value (YES in step S102), the processing proceeds to step S103. In step S103, the digital modem 109 inserts a silent data packet so that the number of audio data packets becomes the median, thus adjusting the amount of data in the jitter buffer 104. After adjusting the amount of data in the jitter buffer 104, in step S104, the digital modem 109 transmits a signal AC from the IPFAX1 100 to a communication partner facsimile apparatus to start control channel retraining.

After transmitting the above-described signal AC, in step S105, the digital modem 109 determines whether the resynchronization procedure of the control channel illustrated in FIG. 4 is performed between the transmitting and receiving sides and control channel retraining is completed. If control channel retraining is completed (YES in step S105), the processing illustrated in FIG. 4 is completed. Then, the digital modem 109 restarts the control channel in a state where the amount of data in the jitter buffer 104 has returned to the median.

On the other hand, if the digital modem 109 determines that the number of audio data packets does not exceed the underflow threshold value (NO in step S102), the processing proceeds to step S106. In step S106, the digital modem 109 determines whether the number of audio data packets exceeds the overflow threshold value. In step S106, if the digital modem 109 determines that the number of audio data packets exceeds the overflow threshold value (YES in step S106), the processing proceeds to step S107. In step S107, the digital modem 109 discards an audio data packet so that the number of audio data packets becomes the median, thus adjusting the jitter buffer 104. After adjusting the jitter buffer 104, in step S104, the digital modem 109 transmits the signal AC from the IPFAX1 100 to the communication partner facsimile to start control channel retraining.

Figure 8:
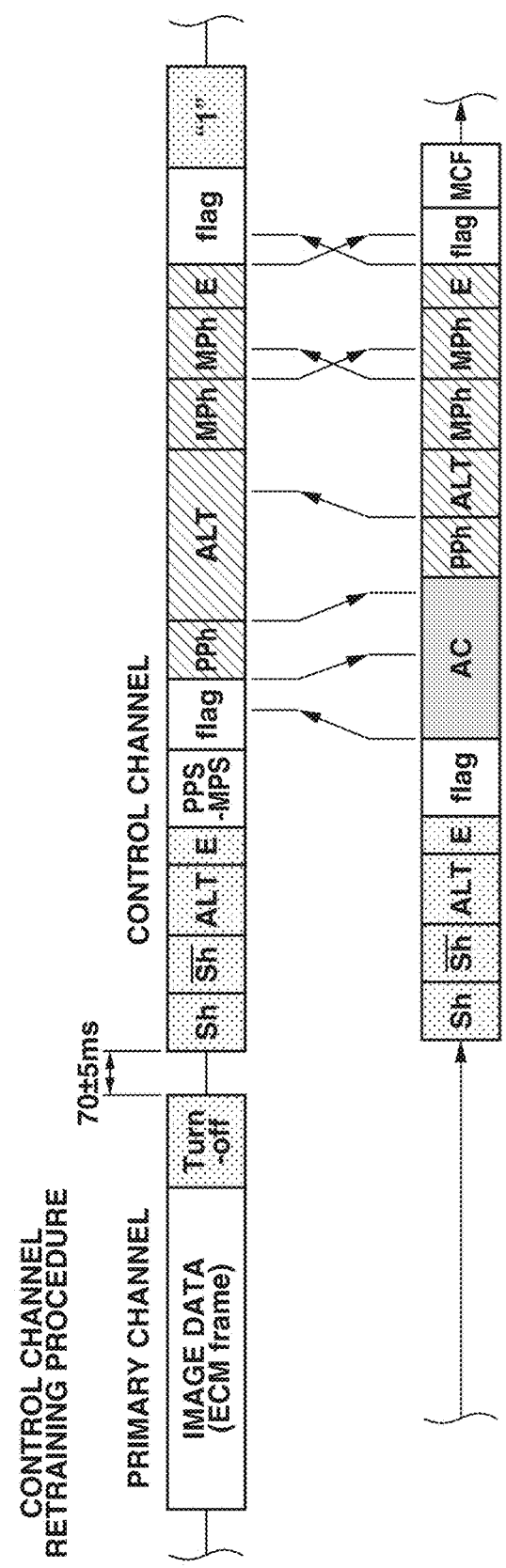
FIG. 8 illustrates operations of a conventional communication apparatus.

After the above-described signal AC is transmitted, the resynchronization procedure of the control channel illustrated in FIG. 8 is performed between the transmitting and the receiving sides. If control channel retraining is completed (YES in step S105), the digital modem 109 terminates the processing of the flowchart illustrated in FIG. 4. Then, the digital modem 109 restarts the control channel in a state where the amount of data in the jitter buffer 104 has returned to the median.

On the other hand, if the digital modem 109 determines that the number of audio data packets does not exceed the overflow threshold value (NO in step S106), the digital modem 109 performs no operation and ends the jitter buffer control.

The present invention supplies a program for implementing at least one function of the above-described exemplary embodiment to a system or an apparatus via a network or a storage medium. The present invention can also be implemented when at least one processor in a computer of the system or the apparatus reads and executes a program. The present invention can also be implemented by a circuit (for example, an application specific integrated circuit (ASIC)) for implementing at least one function.

<Other Embodiments>

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-070921, filed Mar. 31, 2015, which is hereby incorporated by reference herein in its entirety.

What is claimed is:

1. A control method for controlling a communication apparatus configured to perform, by using an internet protocol (IP) network in conformity with ITU-T Recommendation version V.34, packet communication of facsimile image data as audio data via a first channel and to perform facsimile procedure signal exchange via a second channel, wherein the communication apparatus includes a buffer configured to temporarily store transmitted and received packets to synchronize the transmitted and received packets between a transmitting side and a receiving side, the control method comprising:
    executing pre-procedure for facsimile communication via the second channel in conformity with ITU-T Recommendation version V.30;
    executing synchronization procedure for the first channel after execution of the pre-procedure;
    receiving facsimile image data via the first channel after execution of the synchronization procedure for the first channel;
    shifting to the second channel after receiving the facsimile image data;
    executing control processing including (1), (2), and (3) below at a timing of shifting to the second channel:
    (1) acquiring a number of packets stored in the buffer,
    (2) executing packet processing, including discarding one or more packets stored in the buffer in a case where the number of acquired packets exceeds a first threshold value and inserting a silent packet in the buffer in a case where the number of acquired packets does not exceed a second threshold value that is less than the first threshold value, and
    (3) executing synchronization procedure for the second channel after execution of the packet processing; and
    executing post-procedure for facsimile communication via the second channel in conformity with ITU-T Recommendation version V.30 after completion of executing the control processing.

2. The control method according to claim 1, wherein the first threshold value is a threshold value regarding an overflow of packets stored in the buffer.

3. The control method according to claim 1, wherein the second threshold value is a threshold value regarding an underflow of packets stored in the buffer.

4. The control method according to claim 1, wherein executing packet processing includes repeating packet processing each time when packet communication of the first channel and facsimile procedure signal exchange via the second channel are executed.

5. The control method according to claim 1, wherein the first channel is a primary channel conforming to International Telecommunication Union Telecommunication Standardization Sector (ITU)-T Recommendation version V.34.

6. The control method according to claim 1, wherein the second channel is a control channel conforming to International Telecommunication Union Telecommunication Standardization Sector (ITU)-T Recommendation version V.34.

7. The control method according to claim 1, wherein, in the control processing, the synchronization procedure for the second channel that is executed after the execution of the packet processing is control channel retraining conforming to International Telecommunication Union Telecommunication Standardization Sector (ITU)-T Recommendation version V.34.

8. The control method according to claim 1, the control method further comprising repeating, until completion of the receiving of the facsimile image data, executing the synchronization procedure for the first channel, receiving facsimile image data, shifting to the second channel, executing control processing, and executing the post-procedure.

9. A communication apparatus configured to perform, by using an internet protocol (IP) network in conformity with ITU-T Recommendation version V.34, packet communication of facsimile image data as audio data via a first channel and to perform facsimile procedure signal exchange via a second channel, wherein the communication apparatus includes a buffer configured to temporarily store transmitted and received packets to synchronize the transmitted and received packets between a transmitting side and a receiving side, the communication apparatus comprising:
    one or more processors; and
    memory storing instructions that, when executed by the one or more processors, cause the communication apparatus to perform operations including:
    executing pre-procedure for facsimile communication via the second channel in conformity with ITU-T Recommendation version V.30,
    executing synchronization procedure for the first channel after execution of the pre-procedure,
    receiving facsimile image data via the first channel after execution of the synchronization procedure for the first channel,
    shifting to the second channel after receiving the facsimile image data,
    executing control processing including (1), (2), and (3) below at a timing of shifting to the second channel:
    (1) acquiring a number of packets stored in the buffer,
    (2) executing packet processing, including discarding one or more packets stored in the buffer in a case where the number of acquired packets exceeds a first threshold value and inserting a silent packet in the buffer in a case where the number of acquired packets does not exceed a second threshold value that is less than the first threshold value, and
    (3) executing synchronization procedure for the second channel after execution of the packet processing, and
    executing post-procedure for facsimile communication via the second channel in conformity with ITU-T Recommendation version V.30 after completion of executing the control processing.

10. A non-transitory computer-readable storage medium storing a program to cause a computer to execute a control method for controlling a communication apparatus configured to perform, by using an internet protocol (IP) network in conformity with ITU-T Recommendation version V.34, packet communication of facsimile image data as audio data via a first channel and to perform facsimile procedure signal exchange via a second channel, wherein the communication apparatus includes a buffer configured to temporarily store transmitted and received packets to synchronize the transmitted and received packets between a transmitting side and a receiving side, the control method comprising:

executing pre-procedure for facsimile communication via the second channel in conformity with ITU-T Recommendation version V.30;

executing synchronization procedure for the first channel after execution of the pre-procedure;

receiving facsimile image data via the first channel after execution of the synchronization procedure for the first channel;

shifting to the second channel after receiving the facsimile image data;

executing control processing including (1), (2), and (3) below at a timing of shifting to the second channel:

(1) acquiring a number of packets stored in the buffer, (2) executing packet processing, including discarding one or more packets stored in the buffer in a case where the number of acquired packets exceeds a first threshold value and inserting a silent packet in the buffer in a case where the number of acquired packets does not exceed a second threshold value that is less than the first threshold value, and (3) executing synchronization procedure for the second channel after execution of the packet processing; and executing post-procedure for facsimile communication via the second channel in conformity with ITU-T Recommendation version V.30 after completion of executing the control processing.

* * * * *